United States Patent [19]

Sides, III et al.

[11] Patent Number: 5,524,937

[45] Date of Patent: Jun. 11, 1996

[54] INTERNAL COILED TUBING CONNECTOR

[75] Inventors: Winfield M. Sides, III, Houston; Tracey Tollefsbol, Spring, both of Tex.

[73] Assignee: Camco International Inc., Houston, Tex.

[21] Appl. No.: 349,913

[22] Filed: Dec. 6, 1994

[51] Int. Cl.⁶ .................................................. F16L 47/00
[52] U.S. Cl. .................. 285/133.1; 285/286; 285/323; 285/370
[58] Field of Search .................................. 285/131, 132, 285/133.1, 370, 286, 323

[56] References Cited

U.S. PATENT DOCUMENTS

| | | | |
|---|---|---|---|
| 1,521,482 | 12/1924 | Steele | 285/133.1 |
| 1,736,923 | 11/1929 | Lalonde | 285/133.1 |
| 2,054,859 | 9/1936 | Kitching | 285/133.1 X |
| 2,445,249 | 7/1948 | Sproull | 285/137.1 |
| 3,032,116 | 5/1962 | Barry | 285/133.1 X |
| 3,077,358 | 2/1963 | Costa | 285/133.1 X |
| 4,984,827 | 1/1991 | Peppel et al. | 285/133.1 |
| 5,238,273 | 8/1993 | Laflin et al. | 285/119 |
| 5,306,050 | 4/1994 | Laflin et al. | 285/119 |

*Primary Examiner*—Dave W. Arola

[57] ABSTRACT

An internal coiled tubing connector for connecting a first length of coiled tubing to a second length of coiled tubing includes a cylindrical body having a longitudinal bore therethrough and adapted to be inserted into the first length and the second length of coiled tubing; a by-pass passageway extending from a first opening in a longitudinal outer surface of the cylindrical body to a second opening in the longitudinal outer surface of the cylindrical body; and elastomeric seals mounted to the longitudinal outer surface of the cylindrical body adjacent the first opening and the second opening. When the first opening is placed in communication with a passageway within a wall of the first length of coiled tubing and when the second opening is placed in communication with a passageway within a wall of the second length of coiled tubing a communication by-pass is established across the connection of the first length and the second length of coiled tubing.

15 Claims, 11 Drawing Sheets

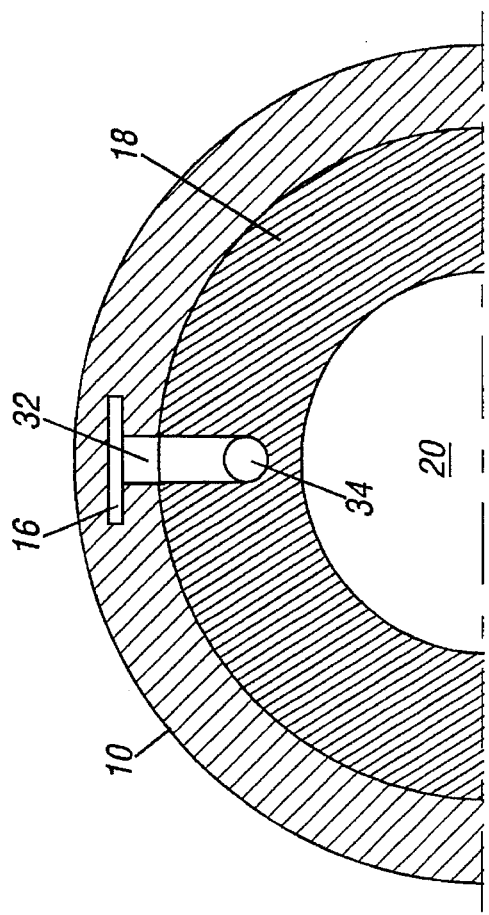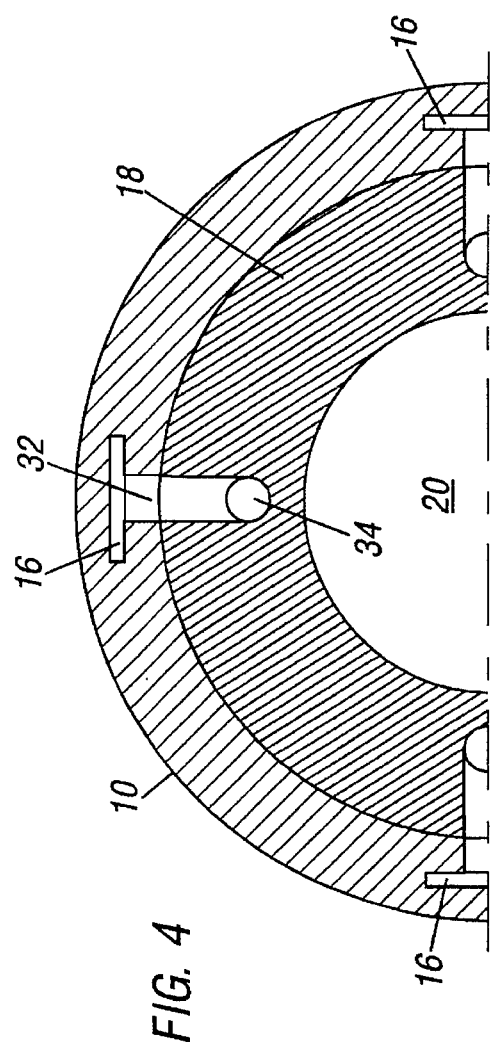

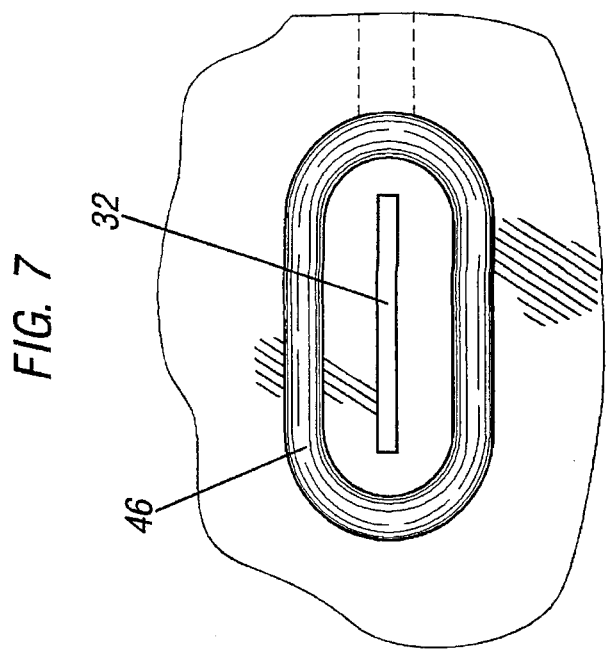
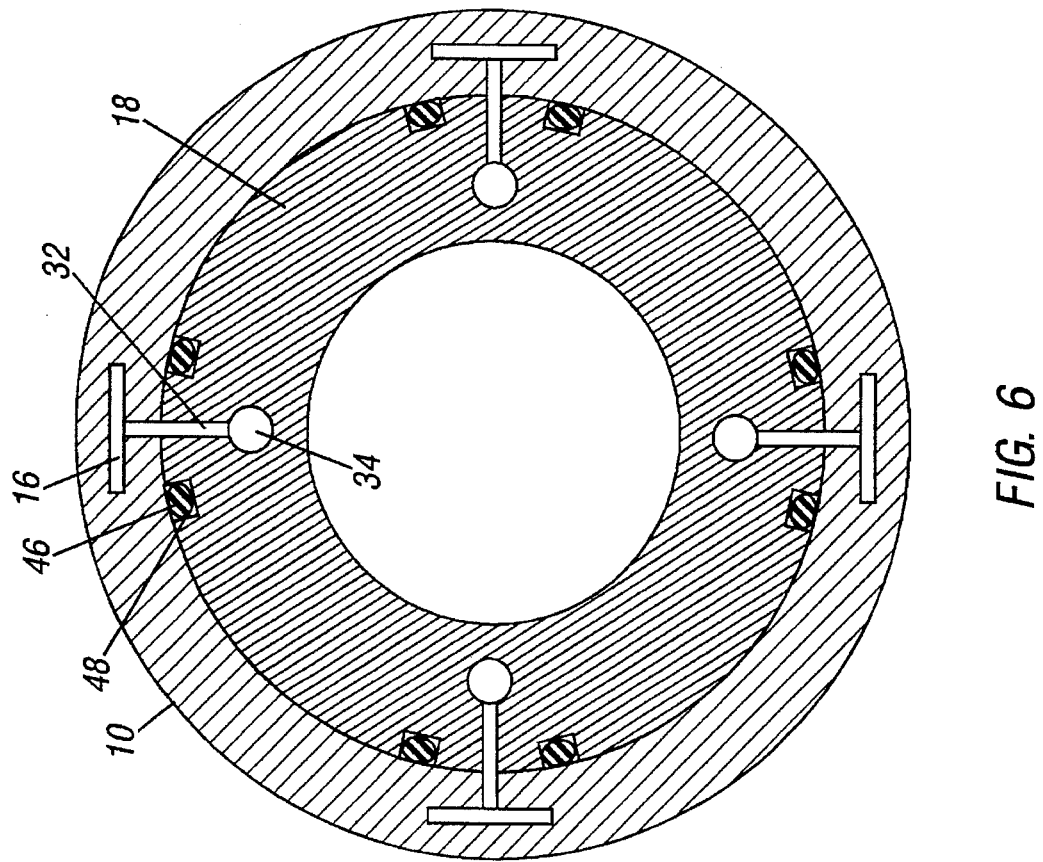

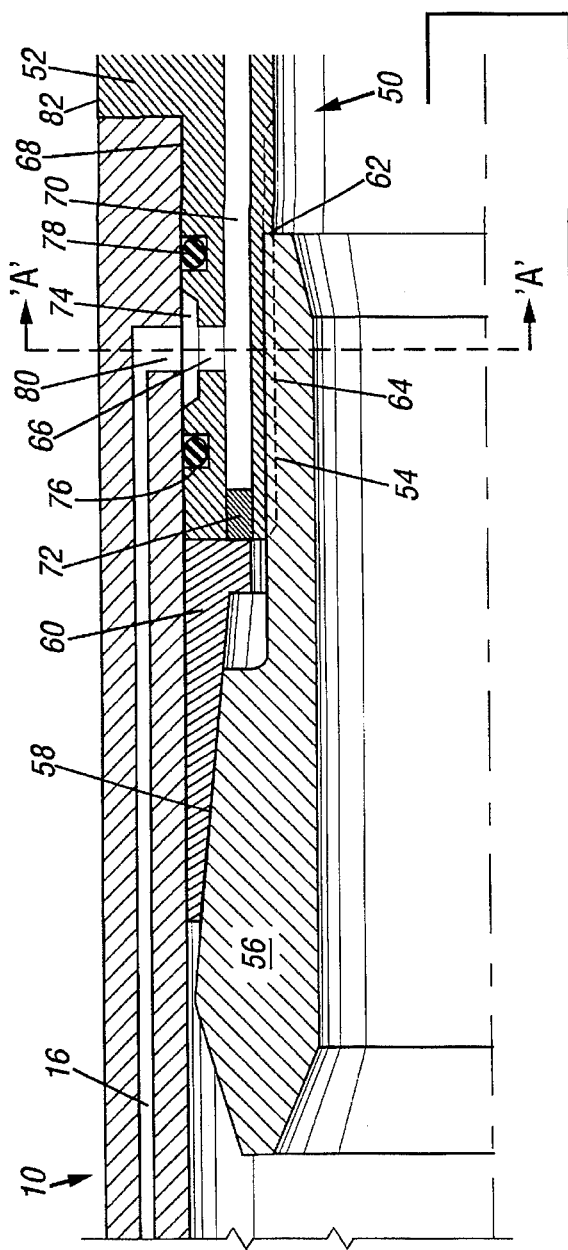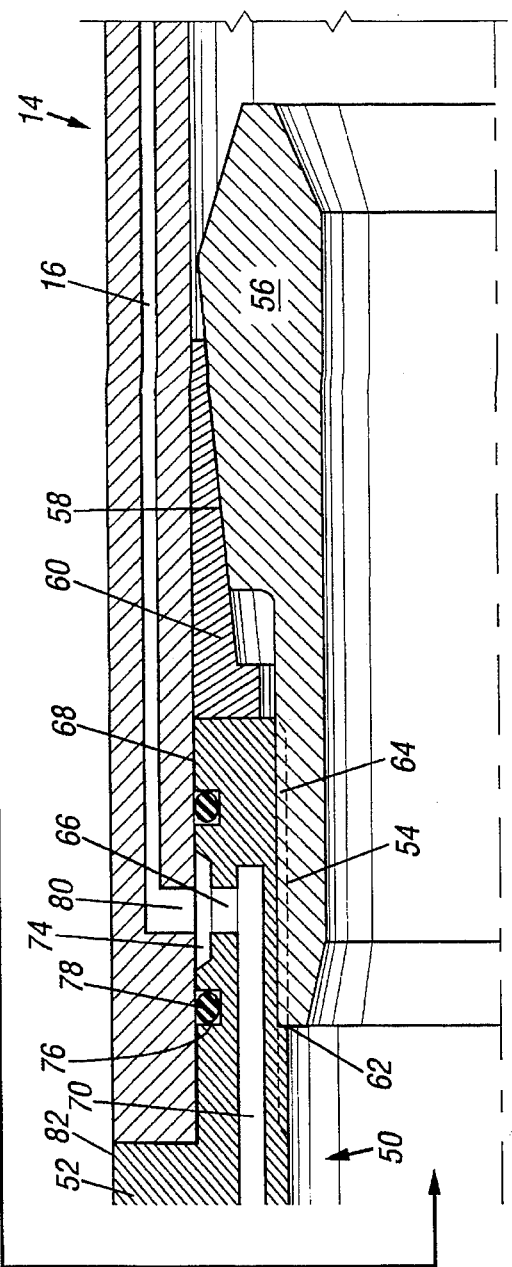

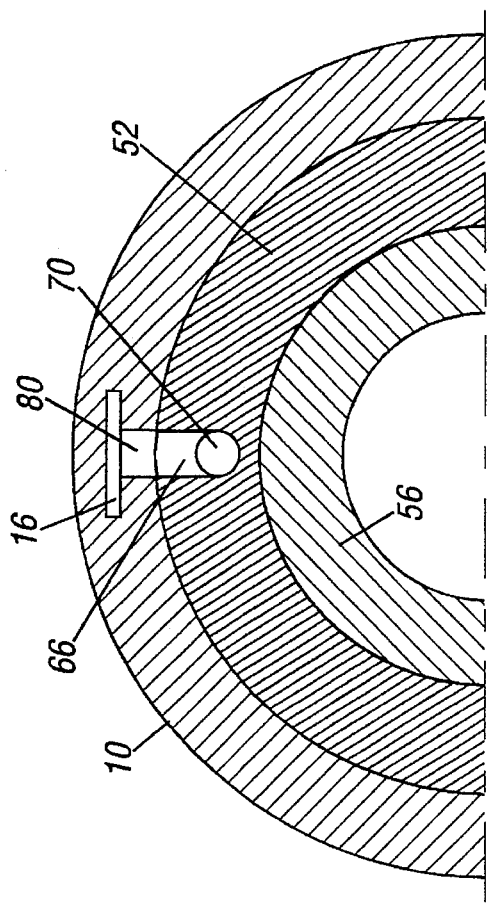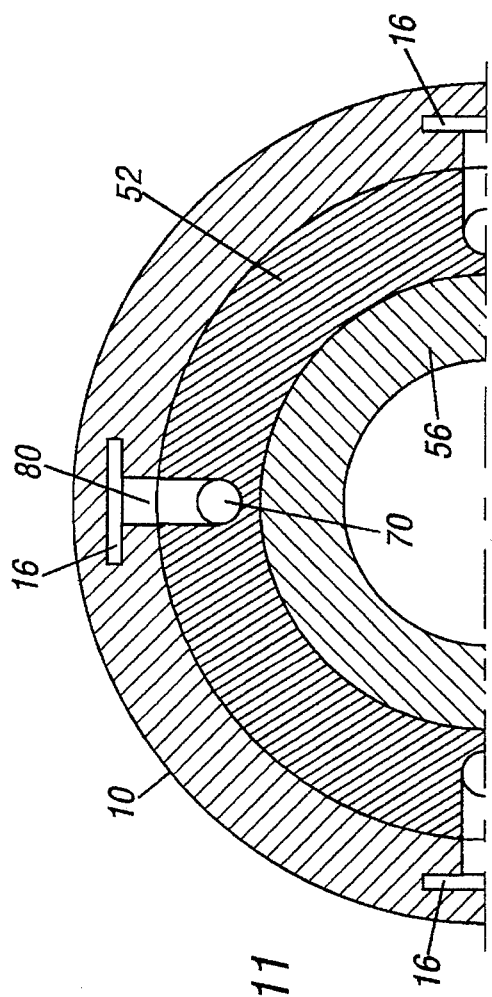

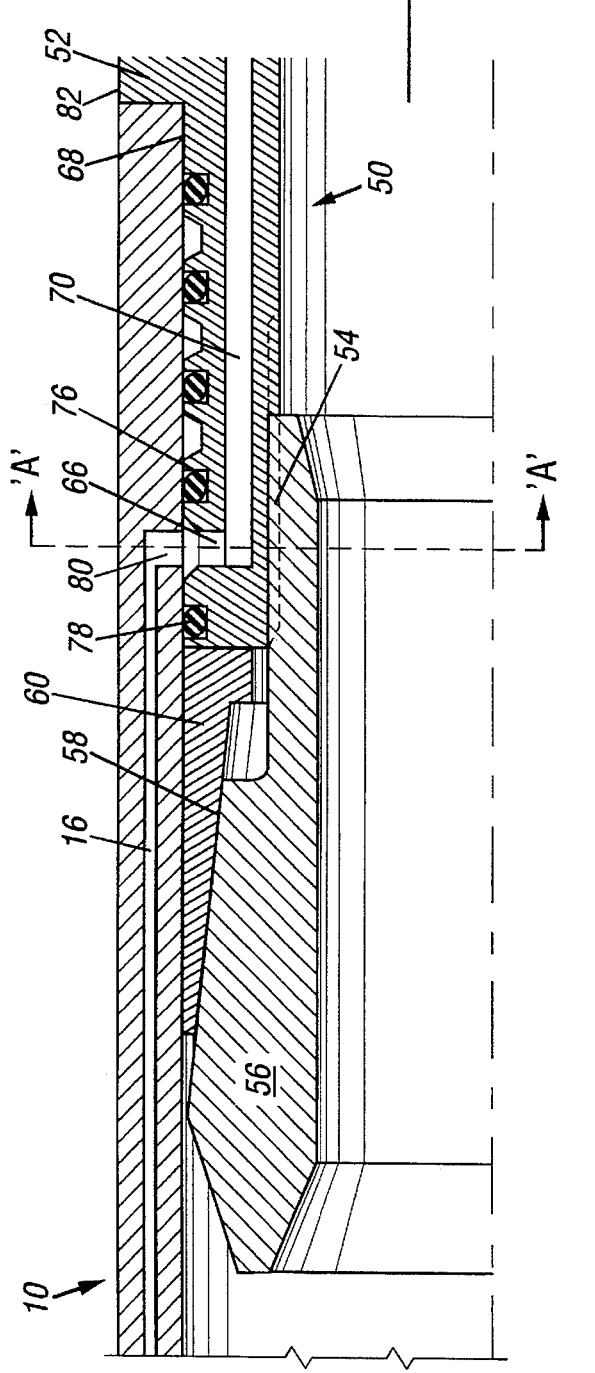
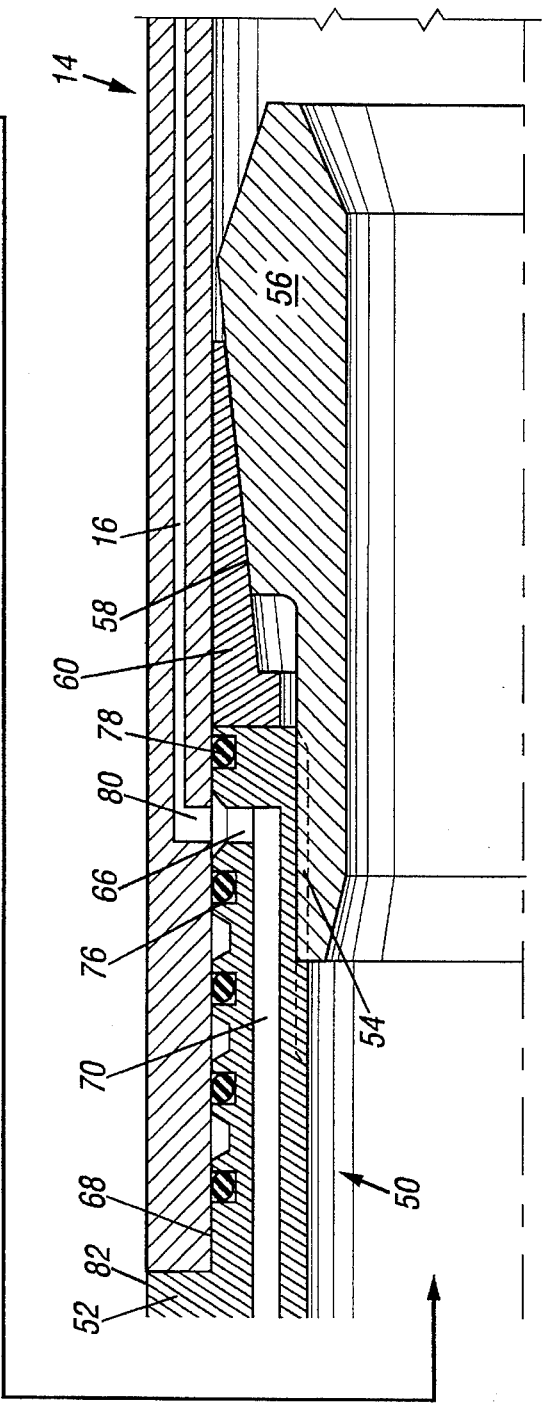
FIG. 10

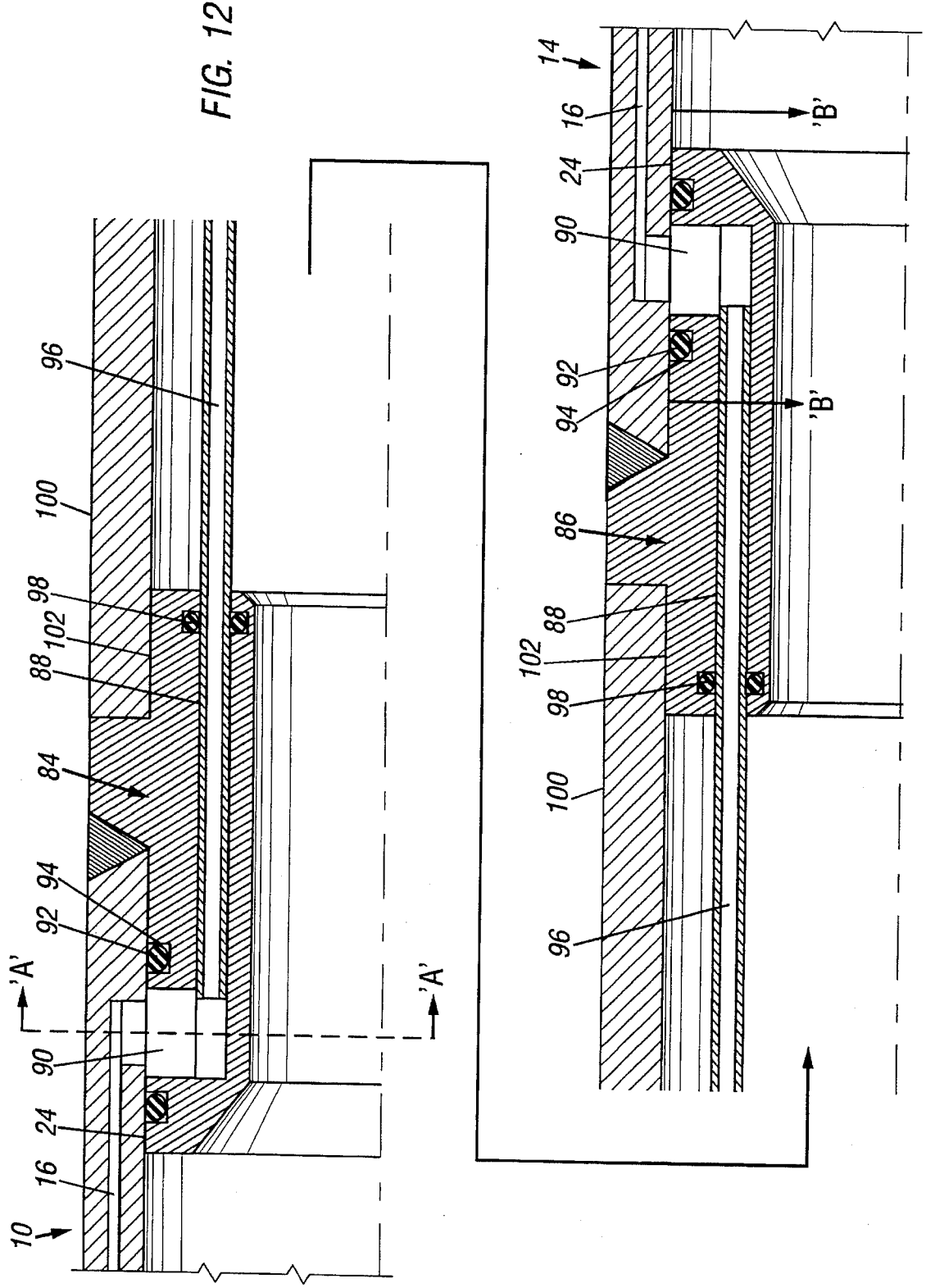

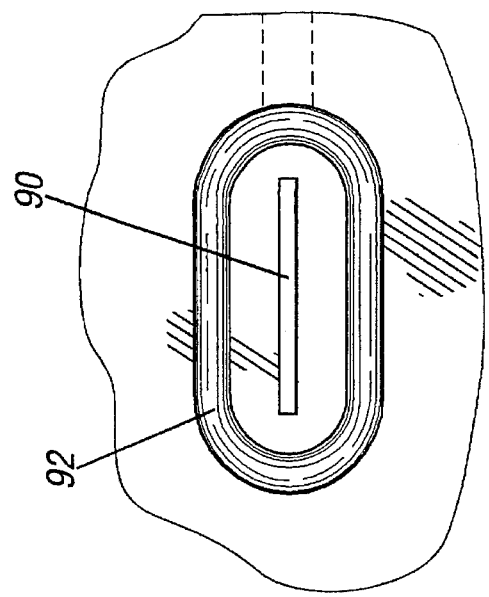
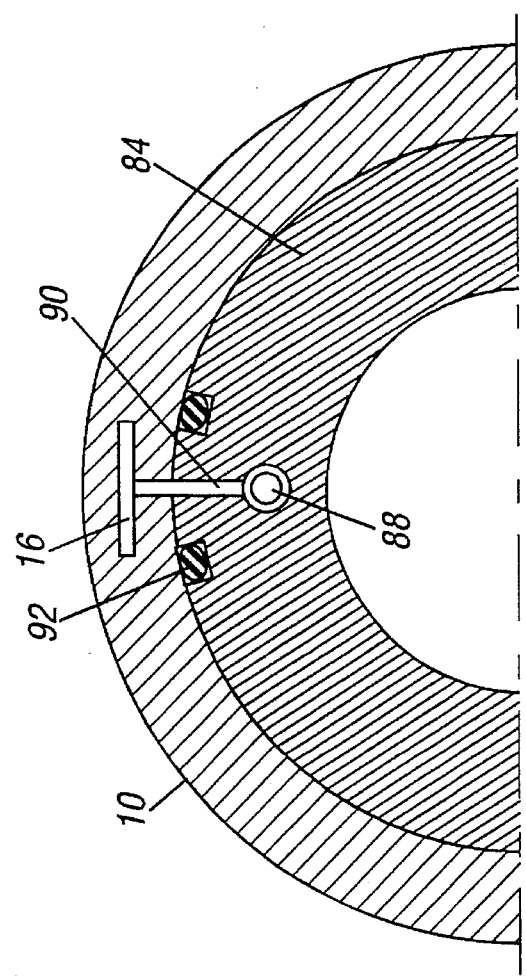

INTERNAL COILED TUBING CONNECTOR

BACKGROUND OF THE INVENTION

1. Field of the Invention

The present invention relates to an internal coiled tubing connector and, more particularly, to a connector that provides communication for internal passageways across a connection between lengths of coiled tubing.

2. Description of Related Art

Coiled tubing is used to provide a fluid passage within a wellbore, as well as to convey tools and equipment into and from a wellbore. Lengths of coiled tubing need to be joined in a manner wherein the external diameter remains constant to accommodate the spooling of the coiled tubing lengths on reels and passage of through the injector mechanisms. Examples of internal coiled tubing connectors are disclosed in U.S. Pat. Nos. 5,238,273 and 5,306,050, which are commonly assigned hereto.

Oftentimes downhole tools and equipment conveyed by coiled tubing require electrical and/or hydraulic control lines that are either disposed within the internal bore of the coiled tubing or are attached to the outer surface of the coiled tubing. The control lines within the coiled tubing render it difficult to impossible to perform wireline operations through the coiled tubing because the wireline tool can become tangled with the control lines. The control lines on the outside of the coiled tubing can become damaged when the coiled tubing is inserted into and withdrawn from the wellbore. Further, control lines on the outside of the coiled tubing hinder the packing off or sealing of the wellbore. To overcome these deficiencies, coiled tubing with an internal passageways within the wall of the coiled tubing has been developed. Such coiled tubing is disclosed within copending U.S. patent application No. 08/142,637, which is commonly assigned hereto.

There is a need for an internal coiled tubing connector that can provide for communication for the passageways within the wall of the coiled tubing across the connection between the lengths of such coiled tubing.

SUMMARY OF THE INVENTION

The present invention has been contemplated to overcome the foregoing deficiencies and meet the above described needs. Specifically, the present invention is an internal coiled tubing connector for connecting a first length of coiled tubing, which has at least one passage in the wall thereof, to a second length of similar coiled tubing. The internal coiled tubing connector includes a cylindrical body having a longitudinal bore therethrough and adapted to be inserted into the first length and the second length of coiled tubing; a by-pass passageway extending from a first opening in a longitudinal outer surface of the cylindrical body to a second opening in the longitudinal outer surface of the cylindrical body; and elastomeric seals mounted to the longitudinal outer surface of the cylindrical body adjacent the first opening and the second opening. When the first opening is placed in communication with a passageway within a wall of the first length of coiled tubing and when the second opening is placed in communication with a passageway within a wall of the second length of coiled tubing a communication by-pass is established across the connection of the first length and the second length of coiled tubing.

BRIEF DESCRIPTION OF THE DRAWINGS

FIG. 2 is a view taken along line A—A of FIG. 1.

FIG. 4 is a view taken along line A—A of FIG. 3.

FIG. 6 is a view taken along line A—A of FIG. 5.

FIG. 7 is a view taken along line B—B of FIG. 5.

FIG. 8 is side elevational view in cross-section of an alternate preferred embodiment of an internal coiled tubing connector mounted using wedge and slip mechanisms within coiled tubing having a single internal passageway.

FIG. 9 is a view taken along line A—A of FIG. 8.

FIG. 10 is side elevational view in cross-section of an alternate preferred embodiment of an internal coiled tubing connector mounted using wedge and slip mechanisms within coiled tubing having a plurality of internal passageways.

FIG. 11 is a view taken along line A—A of FIG. 10.

FIG. 12 is side elevational view in cross-section of an alternate preferred embodiment of an internal coiled tubing connector formed from two separate bodies welded within coiled tubing having at least one internal passageway.

FIG. 13 is a view taken along line A—A of FIG. 12.

FIG. 14 is a view taken along line B—B of FIG. 12.

DETAILED DESCRIPTION OF THE PREFERRED EMBODIMENTS

As has been briefly described above, the present invention is an internal coiled tubing connector for providing internal passageway communication across a connection between a first length and a second length of coiled tubing. One preferred embodiment of the present invention includes a cylindrical body having a longitudinal bore therethrough and adapted to be inserted into the first length and the second length of coiled tubing; a by-pass passageway extending from a first opening in a longitudinal outer surface of the cylindrical body to a second opening in the longitudinal outer surface of the cylindrical body; and elastomeric seals mounted to the longitudinal outer surface of the cylindrical body adjacent the first opening and the second opening. When the first opening is placed in communication with a passageway within a wall of the first length of coiled tubing and when the second opening is placed in communication with a passageway within a wall of the second length of coiled tubing a communication by-pass is established across the connection of the first length and the second length of coiled tubing.

The present invention can be used to provide a by-pass passageway for fluids and control lines, electrical control lines and/or fiber optics across a connection of a first length of coiled tubing to a second length of coiled tubing. These fluid passageways, electrical control lines and/or fiber optics can be strung within the internal bore of the coiled tubing; however, the present invention is particularly adapted to provide the by-pass passageway for coiled tubing that has at least one internal passageway within the wall of the coiled tubing. Such coiled tubing is disclosed within copending U.S. patent application 08/142,637, which is commonly assigned hereto and which is incorporated herein by reference.

As used herein the term "communication" means the ability to pass hydraulic control and actuation fluids, even at elevated pressures, as well as the provision of a route for electrical wires and/or fiber optics within an encapsulated and protected environment.

Figure 1:
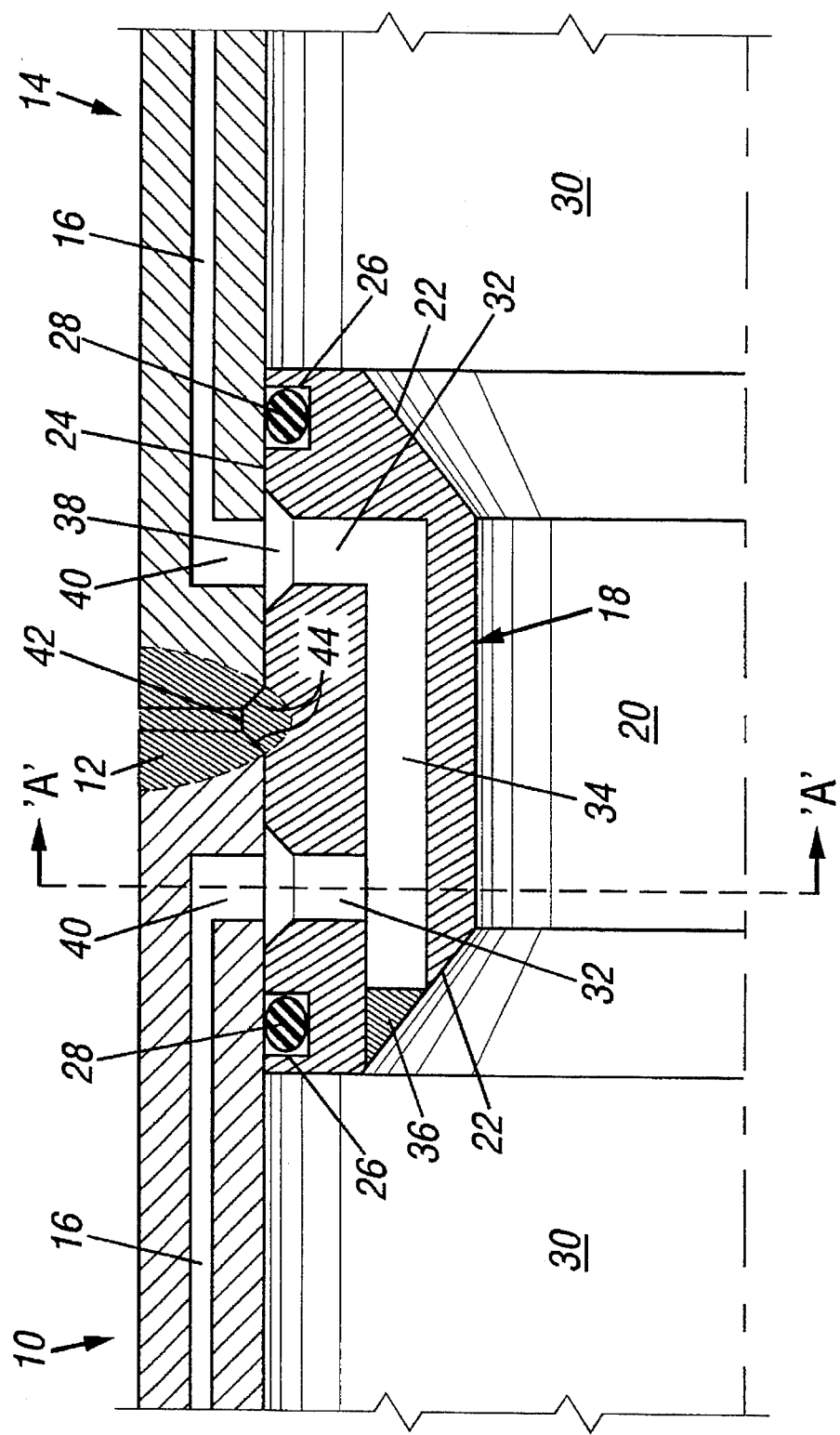
FIG. 1 is side elevational view in cross-section of one preferred embodiment of an internal coiled tubing connector welded within coiled tubing having a single internal passageway.

In FIG. 1 a first length 10 of coiled tubing is shown connected by a welded joint 12 to a second length 14 of coiled tubing. At least one internal passageway 16 is provided within a wall 18 of the coiled tubing 10 and 14. As can be seen in FIG. 1, the welded joint 12 extends across and thereby will block the internal passageways 16 at the connection. Therefore, the present invention is provided to by-pass the welded joint 12 and thereby ensure communication through the internal passageways 16 in the coiled tubing 10 and 14. One preferred embodiment of the present invention is shown in FIG. 1 wherein a generally cylindrical body 18 includes a longitudinal bore 20 extending therethrough. The outer diameter of the cylindrical body 18 is less than the internal diameter of the coiled tubing 10 and 14. The edges of the cylindrical body 18 adjacent the bore 20 are shown with flats or bevels 22, which are preferred to assist wireline equipment and fluids to freely pass through the bore 20, but the bevels 22 are not necessary to establish communication across the connector.

An outer longitudinal surface 24 of the cylindrical body 18 includes an annular recess 26 adjacent a first end and adjacent a second end thereof, and an annular elastomeric seal 28 is mounted within each recess 26. The seals 28 can be O-rings formed from any suitable elastomeric material, and are preferably formed from Aflas, Viton or nitrile rubber. The seals 28 provide a fluidic seal across the longitudinal outer surface 24 of the cylindrical body 18 when the seals 28 engage an inner surface of the longitudinal bore 30 within the coiled tubing 10 and 14.

As shown in FIGS. 1 and 2, at least two spaced bores 32 extend from the outer surface 24 of the cylindrical body 18 partially thereinto to intersect a longitudinal bore 34 extending partially through the cylindrical body 18. If the longitudinal bore 34 is formed by drilling, then a plug 36 of suitable metallic material seals an open end of the longitudinal bore 34. The outer surface 24 is provided with a counter bore at the intersection of the bores 32 with the outer surface 24 of the cylindrical body 18. Preferably, the outer surface 24 includes annular recesses 38 through which the bores 32 extend into the cylindrical body 18. The bores 32 and the longitudinal bore 34 define a by-pass passageway that provides a means for permitting communication between the internal passageways 16 of the coiled tubing 10 and 14 across the welded joint 12.

When the internal coiled tubing connector of the present invention is to be used, the internal passageways 16 within the coiled tubing 10 and 14 are cut, milled or drilled to create openings 40 adjacent the ends of the coiled tubing 10 and 14 to provide a passageway for communication into and from the bore 30 of the coiled tubing 10 and 14. The cylindrical body 18 is inserted into the first length of coiled tubing 10 so that one of the bores 32 is spaced adjacent and in communication with opening 40 in the passageway 16 of the coiled tubing 10. Likewise, the second length 14 of coiled tubing is brought into surrounding engagement with an opposite end of the cylindrical body 18 with the other bore 32 spaced adjacent and in communication with the opening 40 in the passageway 16 of the second length 14 of coiled tubing. To help ensure that the cylindrical body 18 is centered at the point of connection of the coiled tubing, an annular ridge 42 is provided at approximately the center line of the outer surface 24 of the cylindrical body 18, which is preferably the midway point between the bores 32. The outer diameter of the ridge 42 being greater than the internal diameter of the bore 30 in the coiled tubing 10 and 14 so that the cylindrical body 18 cannot move within the bore 30 of the coiled tubing 10 and 14. The annular ridge 42 fits within a bevel 44 formed on an inner edge of the ends of the coiled tubing 10 and 14. The ends of the coiled tubing 10 and 14 are then welded, as is well known to those skilled in the art, to create the welded joint 12. As shown in FIG. 1, the molten material generated during the welding process extends partly into the cylindrical body 18 so securely mount the cylindrical body 18 within the coiled tubing 10 and 14 at the point of connection.

Hydraulic fluid, electrical control lines and/or fiber optics are passed through the passageway 16 of the first length 10 of coiled tubing, through the bore 32, through the bore 34, through the other bore 32, and then into the passageway 16 of the second length 14 of coiled tubing. The use of the internal coiled tubing connector of the present invention permits lengths of coiled tubing to be connected and permit internal passageway communication that has not been available heretofore.

Figure 3:
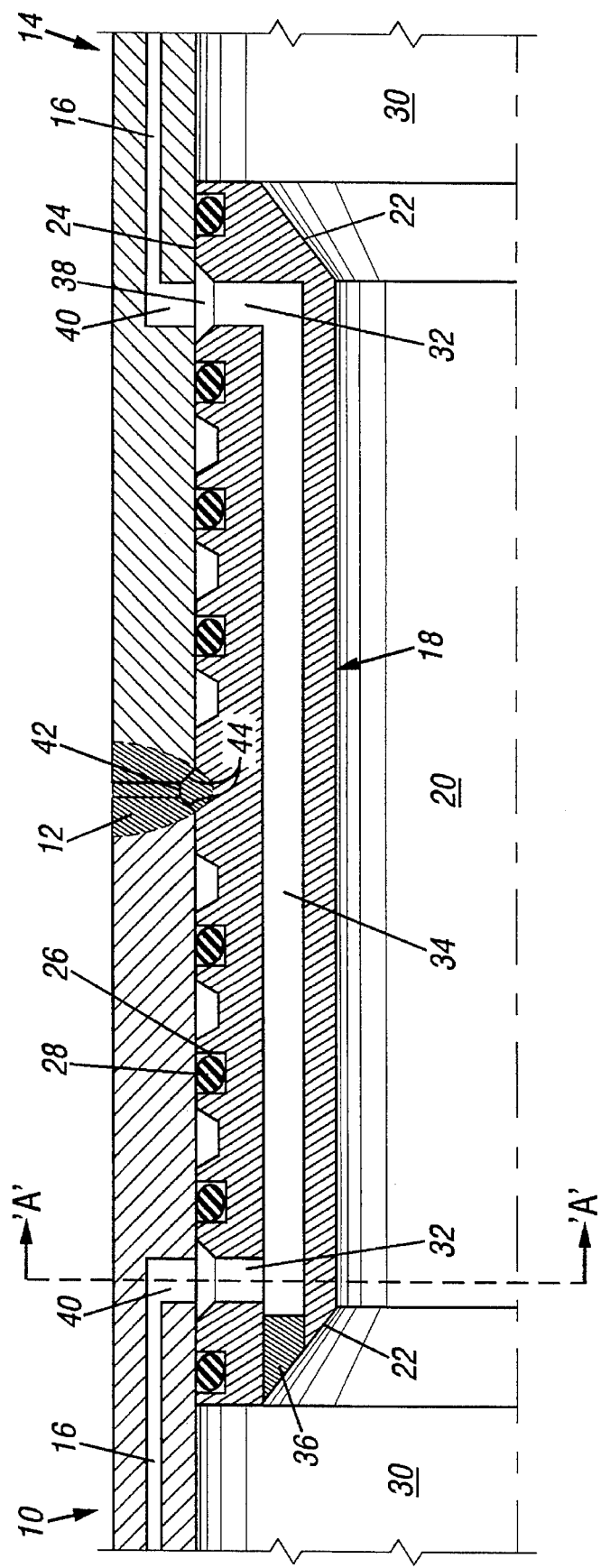
FIG. 3 is side elevational view in cross-section of an alternate preferred embodiment of an internal coiled tubing connector welded within coiled tubing having a plurality of internal passageways.

An alternate preferred embodiment of the internal coiled tubing connector of the present invention is shown in FIGS. 3 and 4 wherein the coiled tubing 10 and 14 include a plurality of passageways 16 with each radially spaced around the wall of the coiled tubing 10 and 14. To permit separate communication across the connection of the coiled tubing 10 and 14, a plurality of longitudinal bores 34 are spaced radially around the cylindrical body 18. Each such longitudinal bore 34 is intersected by its own respective set of bores 32 longitudinally spaced along the outer surface 24 of the cylindrical body 18. To prevent fluid communication between the respective sets of bores 32, the outer surface 24 is provided with a plurality of recesses 26 with elastomeric annular seals 28 mounted therein. The installation and the operation of this preferred embodiment of an internal coiled tubing connector of the present invention is essentially the same as for the embodiment described above in reference to FIGS. 1 and 2.

Figure 5:
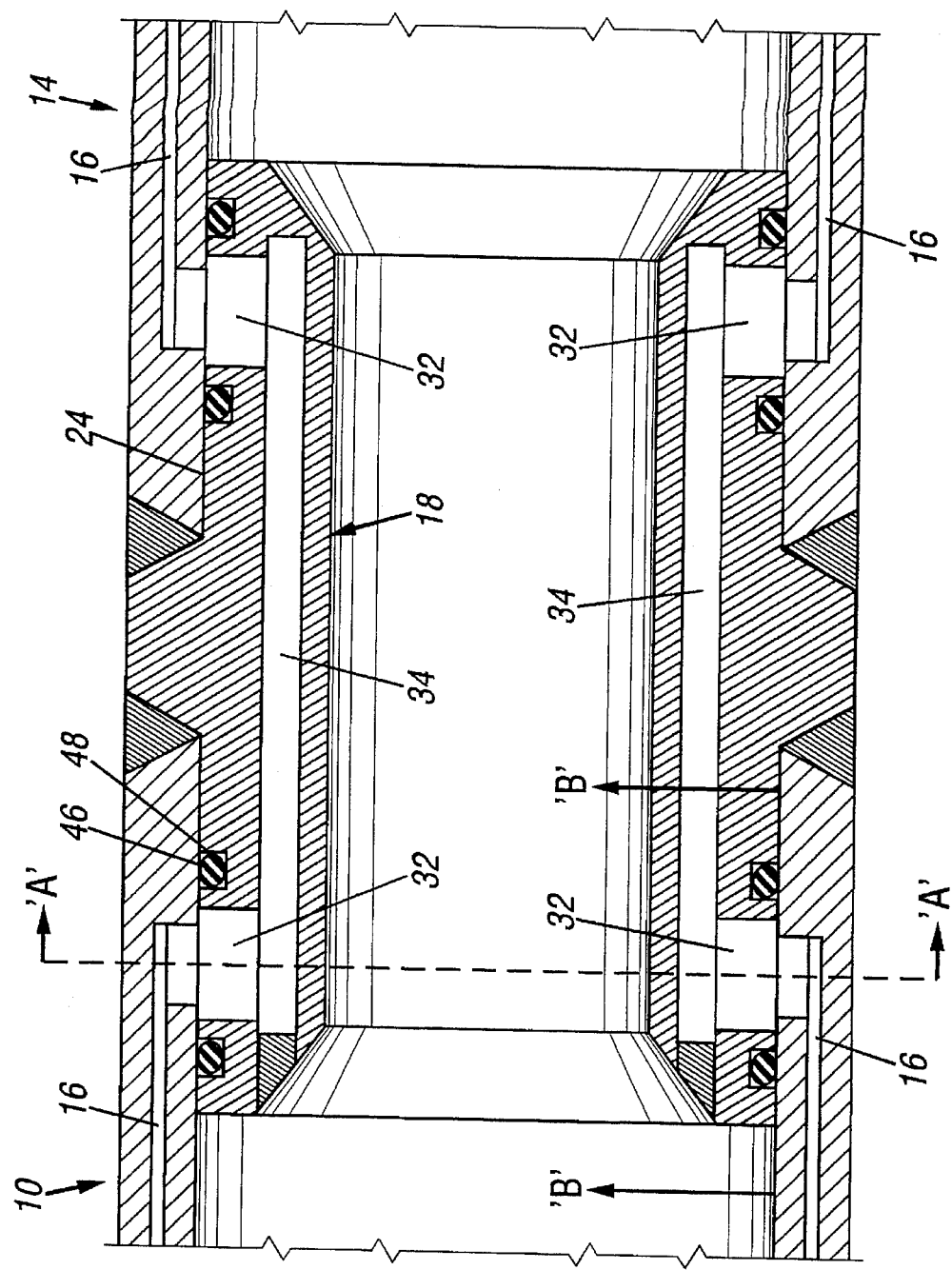
FIG. 5 is side elevational view in cross-section of an alternate preferred embodiment of an internal coiled tubing connector welded within coiled tubing having a plurality of internal passageways.

An alternate preferred embodiment of the internal coiled tubing connector of the present invention is shown in FIGS. 5, 6 and 7 wherein the coiled tubing 10 and 14 include a plurality of passageways 16 with each radially spaced around the wall of the coiled tubing 10 and 14. To permit separate communication across the connection of the coiled tubing 10 and 14, a plurality of longitudinal bores 34 are spaced radially around the cylindrical body 18. Each such longitudinal bore 34 is intersected by its own respective set of bores 32 radially spaced, and not longitudinally spaced as in FIGS. 3 and 4, around the outer surface 24 of the cylindrical body 18. To prevent fluid communication between the respective sets of bores 32, the outer surface 24 is not provided with annular recesses 26, annular O-ring seals 28 and recesses 38 (as shown in FIGS. 3 and 4), but is provided with a generally oval elastomeric seal 46 mounted within a respective oval recess 48 formed within the outer surface 24 of the cylindrical body 18. An oval seal 46 surrounds each of the bores 32 to prevent any fluid leakage into and between the bores 32. Since the bores 32 with the individual oval seals 46 are spaced radially around the cylindrical body 18, this alternate preferred embodiment of the coiled tubing connector of the present invention can be made shorter in length than the embodiment shown in FIGS. 3 and 4. Again, the installation and operation of this embodiment of internal coiled tubing connector of the present invention is essentially the same as that described above.

In the event that a welded connection is not desired, an alternate preferred embodiment of an internal coiled tubing connector of the present invention can be used. As shown in FIGS. 8 and 9, an internal coiled tubing connector 50 is comprised of a generally cylindrical sleeve 52 mounted within an annular recess 54 within an opposed pair of wedge mandrels 56. Within a beveled recess 58 in each of the wedge mandrels 56 is disposed a slip 60 adapted to contact an internal surface of the coiled tubing 10 and 14. On an inner surface of the sleeve 52 an annular ratcheted recess 62 is provided adjacent each end thereof, cooperative with corresponding ratcheted surfaces 64 on the wedge mandrels 56. The configuration and operation of the mechanisms to connect the coiled tubing 10 and 14 can be adapted from any commercially available internal coiled tubing connector; however, it is preferred that wedge and slip mechanisms be used and most preferable of the type shown and described in U.S. Pat. Nos. 5,238,273 and 5,306,050, which are commonly assigned hereto and which are incorporated herein by reference.

The sleeve 52 includes at least two spaced bores 66 extend from an outer surface 68 of the sleeve 52 partially thereinto to intersect a longitudinal bore 70 extending partially through the sleeve 52. If the longitudinal bore 70 is formed by drilling, then a plug 72 of suitable metallic material seals an open end of the longitudinal bore 70. The outer surface 68 is provided with a counter bore at the intersection of the bores 66 with the outer surface 68 of the sleeve 52. Preferably, the outer surface 68 includes annular recesses 74 through which the bores 66 extend into the sleeve 52. The bores 66 and the longitudinal bore 70 define a by-pass passageway that provides a means for permitting communication between the internal passageways 16 of the coiled tubing 10 and 14 across the connection.

The outer surface 68 of the sleeve 52 includes an annular recess 76 adjacent a first end and adjacent a second end thereof, and an annular elastomeric seal 78 is mounted within each recess 76. The seals 78 can be O-rings formed from any suitable elastomeric material, and are preferably formed from Aflas, Viton or nitrile rubber. The seals 78 provide a fluidic seal across the outer surface 68 of the sleeve 52 when the seals 78 engage an internal surface of the longitudinal bore within the coiled tubing 10 and 14.

When this preferred embodiment of internal coiled tubing connector of the present invention is to be used, the internal passageways 16 within the coiled tubing 10 and 14 are cut, milled or drilled to create openings 80 adjacent the ends of the coiled tubing 10 and 14 to provide a passageway for communication into and from the internal bore of the coiled tubing 10 and 14. The first wedge and slip mechanism 56 and 60 is inserted into the first length of coiled tubing 10 so that one of the bores 66 is spaced adjacent and in communication with opening 80 in the passageway 16 of the coiled tubing 10. Likewise, the second length 14 of coiled tubing is brought into surrounding engagement with an opposite wedge and slip mechanism 56 and 60 with the other bore 66 spaced adjacent and in communication with the opening 80 in the passageway 16 of the second length 14 of coiled tubing.

To help ensure that the coiled tubing connector 50 is centered at the point of connection of the coiled tubing, an annular ring 82 is provided at approximately the center line of the outer surface 68 of the sleeve 52, which is preferably the midway point between the two longitudinally spaced bores 66. The outer diameter of the ring 82 is approximately the same as the outer diameter of the coiled tubing 10 and 14 so that the sleeve 52 cannot move within the internal bore of the coiled tubing 10 and 14. The ends of the coiled tubing 10 and 14 are then forced under compression and then tension alternately to cause the slips 60 to be ratcheted along the wedge mandrels 56 to securely grip the internal surface of the coiled tubing 10 and 14, as is described fully in U.S. Pat. Nos. 5,238,273 and 5,306,050. The operation of this alternate preferred embodiment of an internal coiled tubing connector of the present invention is essentially the same as the preferred embodiment described above in reference to FIGS. 1 and 2.

An alternate preferred embodiment of the internal coiled tubing connector of the present invention is shown in FIGS. 10 and 11 wherein the coiled tubing 10 and 14 include a plurality of passageways 16 with each radially spaced around the wall of the coiled tubing 10 and 14. To permit separate communication across the connection of the coiled tubing 10 and 14, a plurality of longitudinal bores 70 are spaced radially around the sleeve 52. Each such longitudinal bore 70 is intersected by its own respective set of bores 66 longitudinally spaced along the outer surface 68 of the sleeve 52. To prevent fluid communication between the respective sets of bores 66, the outer surface 68 is provided with a plurality of recesses 76 with elastomeric annular seals 78 mounted therein. The installation and the operation of this preferred embodiment of an internal coiled tubing connector of the present invention is essentially the same as for the embodiment described above in reference to FIGS. 1 and 2.

An alternate preferred embodiment of the internal coiled tubing connector of the present invention is shown in FIGS. 12, 13 and 14 wherein the coiled tubing connector is comprised of two or more separate bodies with a by-pass conduit extending therebetween to provide the necessary by-pass communication. This embodiment is useful when the coiled tubing is to be bent around a relatively sharp radius that the previous internal coiled tubing connectors would not permit. In this embodiment, the coiled tubing 10 and 14 includes one or more passageways 16, and if there are more than one such passageway 16 then such passageways 16 are radially spaced around the wall of the coiled tubing 10 and 14. To permit communication across the connection of the coiled tubing 10 and 14, longitudinal bores 88 extend partially through the first and the second cylindrical bodies 84 and 86. Each such longitudinal bore 88 is intersected by a bores 90 either radially around and/or longitudinally along the outer surface 24 of the first and the second cylindrical bodies 84 and 86. To prevent fluid communication between the bore(s) 90, the outer surface 24 of each of the first cylindrical body 84 and the second cylindrical body 86 is provided with annular recesses and annular O-ring seals, or preferably with a generally oval elastomeric seal 92 mounted within a respective oval recess 94 formed within the outer surface 24 of the first and the second cylindrical bodies 84 and 86. An oval seal 92 surrounds each of the bores 90 to prevent any fluid leakage into and between the bores 90.

A by-pass conduit 96, formed from metallic hydraulic control line or from aircraft-style hose and fittings, is inserted into the respective longitudinal bores 88 of the first and the second cylindrical bodies 84 and 86, and is sealed therein by means of one or more elastomeric annular seals 98. The gap between the first and the second spaced cylindrical bodies 84 and 86 is determined by the length of the by-pass conduit 96 and a length of coiled tubing 100 that is mounted within annular notches 102 within opposed ends of the first and the second cylindrical bodies 84 and 86. The first and second cylindrical bodies 84 and 86 are welded in place as described above in reference to the embodiments shown in FIGS. 1 and 2 and FIGS. 5,6 and 7. Additionally and preferably the coiled tubing 100 is welded to the first and the second bodies 84 and 86. Again, the operation of this alternate preferred embodiment of the internal coiled tubing connector of the present invention is essentially the same as that described above in reference to FIGS. 1 and 2 and FIGS. 5, 6 and 7.

Figure 15:
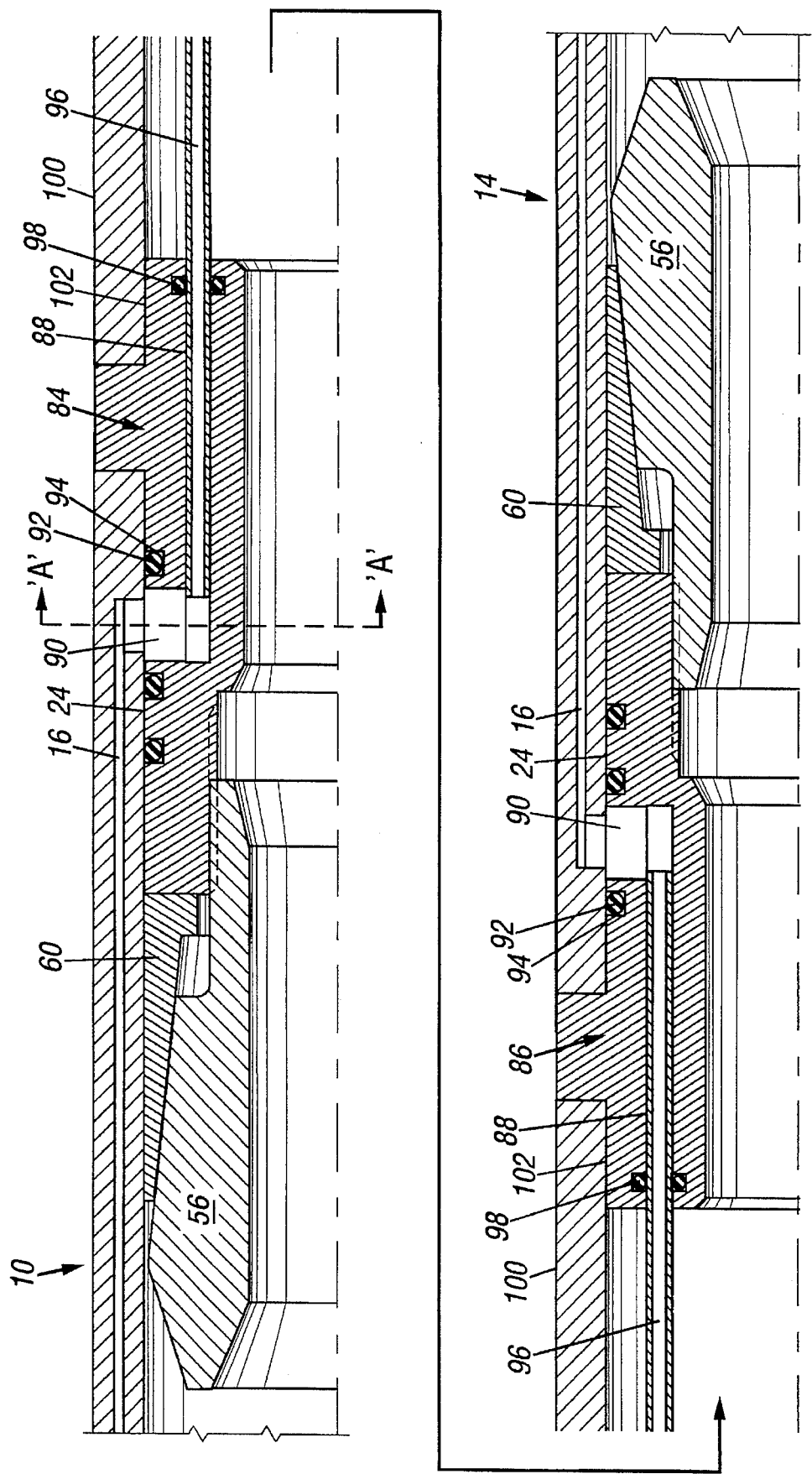
FIG. 15 is side elevational view in cross-section of an alternate preferred embodiment of an internal coiled tubing connector formed from two separate bodies mounted using wedge and slip mechanisms within coiled tubing having at least one internal passageway.

FIG. 15 shows an alternate preferred embodiment of the internal coiled tubing connector of the present invention described in relation to FIGS. 12, 13 and 14, but that this embodiment uses internal wedge and slip mechanisms in place of welding, as previously described in relation to FIGS. 8 and 9 and FIGS. 10 and 11.

Whereas the present invention has been described in relation to the drawings attached hereto, it should be understood that other and further modifications, apart from those shown or suggested herein, may be made within the scope and spirit of the present invention.

What is claimed is:

1. An internal coiled tubing connector for connecting a first length of coiled tubing to a second length of coiled tubing, comprising:

a cylindrical body having a longitudinal bore therethrough and having means for gripping a respective end portion of the first length and the second length of coiled tubing;

the cylindrical body having a by-pass passageway extending from a first opening in a longitudinal outer surface of the cylindrical body to a second opening in the longitudinal outer surface of the cylindrical body; and elastomeric seals mounted to the longitudinal outer surface of the cylindrical body adjacent the first opening and the second opening;

wherein the coiled tubings have passageways within and parallel to the walls thereof, and when the first opening is placed in communication with the passageway within the wall of the first length of coiled tubing and when the second opening is placed in communication with the passageway within the wall of the second length of coiled tubing a communication by-pass is established across the connection of the first length and the second length of coiled tubing.

2. An internal coiled tubing connector of claim 1 wherein the by-pass passageway is formed within the wall of the cylindrical body.

3. An internal coiled tubing connector of claim 2 wherein the by-pass passageway comprises a longitudinal bore within a wall of the cylindrical body, with lateral bores extending through the wall of the cylindrical body from the first opening to the longitudinal bore and from the second opening to the longitudinal bore.

4. An internal coiled tubing connector of claim 1 wherein the longitudinal outer surface of the cylindrical body includes an annular ridge midway between the first opening and the second opening, the annular ridge having an outer diameter greater than an internal diameter of the first length and the second length of coiled tubing.

5. An internal coiled tubing connector of claim 1 wherein the longitudinal outer surface of the cylindrical body includes annular recesses, and the elastomeric seals are received within the annular recesses.

6. An internal coiled tubing connector of claim 1 wherein the means for gripping the first length and the second length of coiled tubing includes a welded connection.

7. An internal coiled tubing connector of claim 1 and further comprising a plurality of separate by-pass passageways extending from separate first openings in the cylindrical body to separate second openings in the cylindrical body, each such by-pass passageway to establish communication by-passes with corresponding separate passageways within the walls of the first length and the second length of coiled tubing.

8. An internal coiled tubing connector of claim 7 wherein the plurality of separate first openings and second openings are radially spaced around the cylindrical body.

9. An internal coiled tubing connector of claim 8 wherein the plurality of separate first openings and second openings are longitudinally spaced along and radially spaced around the cylindrical body.

10. An internal coiled tubing connector of claim 9 wherein elastomeric seals surround each of the first openings and each of the second openings.

11. An internal coiled tubing connector of claim 1 wherein the gripping means comprises a first wedge and slip mechanism mounted adjacent a first end of the cylindrical body and a second wedge and slip mechanism mounted adjacent a second end of the cylindrical body, the first and the second wedge and slip mechanisms adapted to connect the first length and the second length of coiled tubing.

12. An internal coiled tubing connector of claim 11 wherein the first and the second wedge and slip mechanisms each include a ratchet means for ratcheting the wedges into wedging engagement with the slips upon alternate application of tension and compression to grip an internal surface of the first length and the second length of coiled tubing.

13. An internal coiled tubing connector for connecting a first length of coiled tubing to a second length of coiled tubing, comprising:

a cylindrical body having a longitudinal bore therethrough;

a first wedge and slip mechanism mounted adjacent a first end of the cylindrical body and a second wedge and slip mechanism mounted adjacent a second end of the cylindrical body, the first and the second wedge and slip mechanisms for insertion into respectively the first length and the second length of coiled tubing for connecting the first and second lengths of coiled tubing;

a by-pass passageway extending from a first opening in a longitudinal outer surface of the cylindrical body to a second opening in the longitudinal outer surface of the cylindrical body; and elastomeric seals mounted to the longitudinal outer surface of the cylindrical body adjacent the first opening and the second opening;

wherein the coiled tubings have passageways within and parallel to the walls thereof, and when the first opening is placed in communication with the passageway within the wall of the first length of coiled tubing and when the second opening is placed in communication with the passageway within the wall of the second length of coiled tubing a communication by-pass is established across the connection of the first length and the second length of coiled tubing.

14. An internal coiled tubing connector for connecting a first length of coiled tubing to a second length of coiled tubing, comprising:

a first cylindrical body having a longitudinal bore therethrough and having means at an end thereof for gripping an end position of the first length of coiled tubing, a second cylindrical body having a longitudinal bore therethrough and having means at an end thereof for gripping an end portion of the second length of coiled tubing;

a by-pass passageway extending from a first opening in a longitudinal outer surface of the first cylindrical body to a second opening in the longitudinal outer surface of the second cylindrical body; and elastomeric seals mounted to the longitudinal outer surface of the first and the second cylindrical bodies on opposite sides of the first opening and the second opening;

wherein the coiled tubings have passageways within and parallel to the walls thereof, and when the first opening is placed in communication with the passageway within the wall of the first length of coiled tubing and when the second opening is placed in communication with the passageway within the wall of the second length of coiled tubing a communication by-pass is established across the connection of the first length and the second length of coiled tubing.

15. An internal coiled tubing connector of claim 14 wherein the gripping means further comprises a first wedge and slip mechanism mounted adjacent a first end of the first cylindrical body and a second wedge and slip mechanism mounted adjacent a second end of the second cylindrical body, the first and the second wedge and slip mechanisms adapted to connect the first length and the second length of coiled tubing.

* * * * *